(12) United States Patent
Zhang et al.

(10) Patent No.: US 11,347,424 B1
(45) Date of Patent: *May 31, 2022

(54) OFFSET SEGMENTATION FOR IMPROVED INLINE DATA DEDUPLICATION

(71) Applicant: Veritas Technologies LLC, Santa Clara, CA (US)

(72) Inventors: Xianbo Zhang, Zhang, TX (US); Yong Yang, Beijing (CN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/839,140

(22) Filed: Apr. 3, 2020

Related U.S. Application Data

(63) Continuation of application No. 16/156,627, filed on Oct. 10, 2018, now Pat. No. 10,671,305.

(51) Int. Cl.
*G06F 12/00* (2006.01)
*G06F 3/06* (2006.01)

(52) U.S. Cl.
CPC .......... *G06F 3/0641* (2013.01); *G06F 3/0608* (2013.01); *G06F 3/0653* (2013.01); *G06F 3/0656* (2013.01); *G06F 3/0685* (2013.01)

(58) Field of Classification Search
CPC .... G06F 3/0641; G06F 3/0685; G06F 3/0608; G06F 3/0656; G06F 3/0653
USPC ........................................................ 711/207
See application file for complete search history.

(56) References Cited

U.S. PATENT DOCUMENTS

| 5,121,205 A | * | 6/1992 | Ng | ........................ H04N 7/081 348/568 |
| 2002/0031126 A1 | | 3/2002 | Crichton et al. | |
| 2017/0374151 A1 | * | 12/2017 | Moorthi | .............. H04L 67/2847 |

* cited by examiner

*Primary Examiner* — Mardochee Chery

(57) ABSTRACT

Systems and methods for processing data segments are disclosed. In one embodiment, such functionality includes buffering data received from a node (where the data is stored in a buffer as buffered data, an offset value is associated with the data, and a segment size is associated with the buffer), and determining whether the offset value is an integer multiple of the segment size. In response to determination that the offset value is an integer multiple of the segment size, processing the data in the buffer as a segment. Such functionality also includes determining whether the segment is a duplicate of data stored in a deduplicated data store and, in response to a determination that the segment is not a duplicate of data stored in the deduplicated data store, storing the segment in the deduplicated data store.

20 Claims, 6 Drawing Sheets

OFFSET SEGMENTATION FOR IMPROVED INLINE DATA DEDUPLICATION

CROSS-REFERENCE TO RELATED APPLICATIONS

The present patent application is a continuation of U.S. patent application Ser. No. 16/156,627, filed on Oct. 10, 2018, entitled "Offset Segmentation for Improved Inline Data Deduplication," which is incorporated by reference herein in its entirety and for all purposes.

BACKGROUND OF THE INVENTION

Field of the Invention

This disclosure generally pertains to data deduplication, and more specifically to various techniques that can be used to increase the efficiency of inline data deduplication performed prior to writing a given portion of data to a backup storage system, among other benefits, uses, and functionality.

State of the Technology

Data deduplication generally refers to a process of condensing the amount of data stored in a shared storage system by removing common portions, or "segments," of that data. Data deduplication can be performed either "inline" or as part of a "backup workload," among other possibilities. Inline deduplication generally involves the removal of redundancies from data either before the data is written to a backup device, or as the data is being written to a backup device. In contrast, workload deduplication generally involves the removal of redundancies from data after the data has already been written to a backup device.

SUMMARY OF THE DISCLOSURE

The disclosure generally includes methods, computer program products, computer systems, and the like, that provide for the use of offset segmentation to improve inline data deduplication. In one embodiment, data is received and buffered until the buffer becomes full, a sync or flush call is received, or the buffer data ages out. The system and methods described herein then segment the data in the buffer for use in deduplication. In various embodiments, this segmentation can include the use of an offset value to segment the data into segments and modified segments that are more appropriate and efficient for deduplication purposes. In other embodiments, this segmentation can be performed in another manner. After the data in the buffer has been appropriately and efficiently segmented, the segmented data is then deduplicated, such as in the manner discussed herein. Segments that are determined to be non-duplicative of previously stored data can be added to a deduplicated storage, along with metadata or other information associated with that data. When segments are determined to be duplicative of previously stored data, the segment does not have to be stored again, although metadata, pointers (or other data structures), and/or other information identifying or otherwise associated with the data segment can be stored in the deduplicated data storage.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

Figure 1:
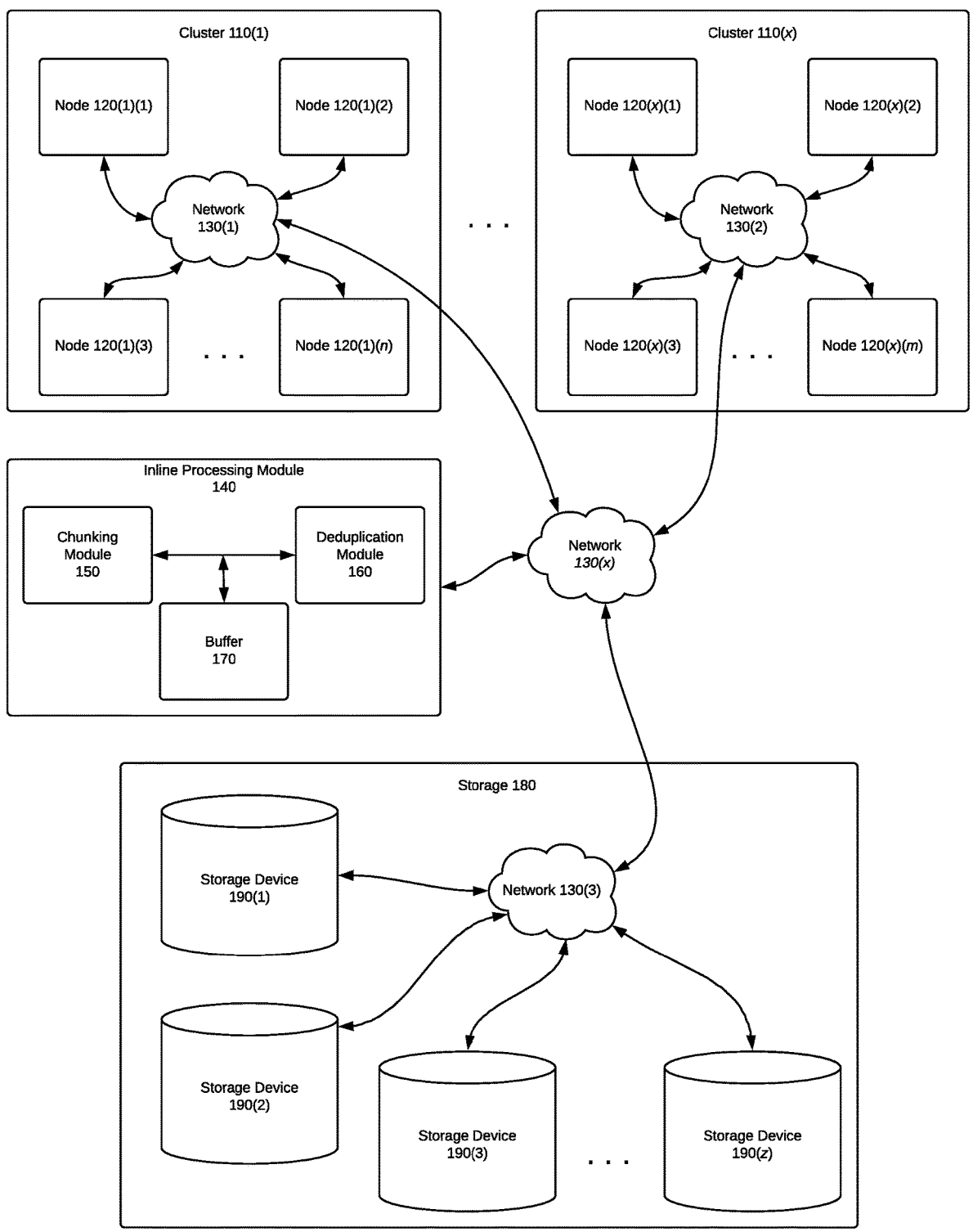
FIG. 1 is a block diagram depicting an example computing environment for performing inline data deduplication, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

Data deduplication can be performed either "inline" or as part of a "backup workload," among other possibilities. Inline data deduplication generally involves deduplicating data either before the data is written to a storage system (such as, e.g., a shared storage system), or as the data is being written to such a storage system. Conversely, workload deduplication generally involves the removal of redundancies from data after the data has already been written to a backup device.

Regardless of the specific method used, data deduplication can, and often does, occur at the segment level of the data. To that end, there are two groups of segmentation approaches for deduplication: fixed length segmentation, and variable length segmentation. As the name implies, fixed length segmentation chunks data streams into fixed-length segments of a certain size, such as, e.g., 4 KB or 128 KB, and then deduplicates that data on a segment-by-segment basis. Although fixed length segmentation methods can be efficient in many ways (e.g., consuming less computer processing resources), such methods can also result in lower deduplication ratios, which in turn can result in increased storage costs as a result of the need to store more data. One example of fixed length segmentation producing such lower deduplication ratios is the situation where changes are made to the middle of a file that was already backed up in a previous state. The changes may cause the data following the changes to be chunked differently, thereby resulting in much of the data being stored for a second time, even though that data is duplicative of a previous version. For instance, consider a 20 KB file and a fixed length segmentation system with 4 KB segment sizes. Chunking this file would result in five segments of 4 KBs each, which can be shown in the following diagram, with each rectangle representing one chunk of data, and the range of numbers within each rectangle representing a range of kilobytes from the 20 KB file:

| {1-4} | {5-8} | {9-12} | {13-16} | {17-20} |
|---|---|---|---|---|

After the file is initially backed up, a user may add one kilobyte of data to the middle of the file, as one example. For the sake of this example, assume that the one kilobyte of additional data is added immediately following the original $8^{th}$ kilobyte of data. For the sake of discussion, we will refer to this new kilobyte of data as "21," since that "new" kilobyte is the $21^{st}$ kilobyte of data, even though that "new" kilobyte is in the middle of the file when viewed in a normal document viewer (e.g., MICROSOFT WORD). (This is obviously a simplistic example for the sake of explanation; in practice, it would be quite rare, although not impossible, for exactly one kilobyte of new data to be added at the precise boundary between any two of the original kilobytes of data.) When this file is backed up the next time, the chunking may now look like this if fixed-length segmentation is used:

| {1-4} | {5-8} | {21, 9-11} | {12-15} | {16-19} | {20} |
|---|---|---|---|---|---|

As the reader can see, each of the first five chunks still includes four consecutive kilobytes of data, in the order in which those kilobytes now appear in the file. However, because the new "$21^{st}$" kilobyte was added to the middle of the file, immediately after the original $8^{th}$ kilobyte, each of the remaining original kilobytes is pushed one kilobyte later in the file. This corresponds to each of the $9^{th}$ through $20^{th}$ kilobytes moving to the right by one position in the diagram above. As such, only the first two segments (kilobytes 1-4 and 5-8) would match up exactly with a previously stored segment, and as such, only those segments would be deduplicated without having to be re-added to the storage system. However, the contents of each of the remaining segments would not match up exactly with any of the previously-stored segments, due to the shifting caused by the insertion of the new data in the middle of the file. Thus, even though only one kilobyte of data has been added in this example, eleven of the original twenty kilobytes of data would have to be stored a second time in the storage system since the segments containing kilobytes 9 through 20 would not match up exactly with any previously stored segment. Thus, each of these latter four chunks would have to be stored again, even though they largely contain data that has already been backed up, e.g., kilobytes 9 through 20. As such, thirteen kilobytes of data (out of a total of 21 kilobytes in the revised file) would have to be stored in duplicate. This can obviously lead to inefficiencies in the use of storage space, among other potential problems.

Variable length segmentation can be used to eliminate problems such as this, in that variable length chunks can be used to create smaller segments, which can in turn result in a higher deduplication ratio. For instance, if 4 kilobyte fixed-length segments are used, then one segment would only be treated as a duplicate of another segment if all 4 kilobytes of both segments were identical. However, in a variable length segmentation scheme, the system could create a segment that only included the changed data in the example above, thereby allowing the subsequent segments to remain the same as they were when the data was originally stored. For instance, using variable length chunks, the data from the edited file could be represented by the following chunk scheme:

| {1-4} | {5-8} | {21} | {9-12} | {13-16} | {19-20} |
|---|---|---|---|---|---|

As can be seen from this variable length segmentation scheme, the new data (kilobyte 21) can be assigned its own chunk, even though that new data is in the middle of the file. As such, the unchanged data can remain in its original chunking scheme, and therefore will appear to the system as duplicate data that does not have to be stored again. As such, in this example, only one additional kilobyte of data would have to be stored in the storage system as a result of the changes to the original file, which is obviously an improvement over the thirteen additional kilobytes of data that would have to be stored in the fixed-length segmentation example provided above. Alternatively, the use of variable length segmentation could find a new set of segments that can be used to more efficiently deduplicate the data. However, although variable length segmentation can increase the deduplication ratio (i.e., data can be deduplicated more efficiently than with fixed length segmentation) as compared to fixed length segmentation, variable length segmentation has the disadvantage of typically requiring more processing power and resources than fixed length segmentation during the processing of the data itself. For instance, when a sliding window algorithm (or a variant thereof) is used, the system must buffer the incoming writes in order to calculate a series of checksums on a rolling basis ("rolling checksums") against the bytes in order to determine the proper point at which the data should be split into segments. This sort of functionality does not work well for file systems that may require frequent flush and/or sync operations, as such operations can cause the points at which the variable length segments' boundaries are set ("chop points") to change, causing or otherwise requiring additional processing. Moreover, using rolling checksums in this manner introduce unwanted processing overhead that increases latency with respect to file input/output ("I/O") response times, which is obviously not good for applications that require a fast I/O response time.

In addition to the above concerns regarding fixed length segmentation and variable length segmentation, other problems arise in the context of inline deduplication that are not necessarily present when performing deduplication via a backup workload at a server. For instance, the file writes may be in sequential or random order when inline deduplication is being used, whereas a backup workload will generally only be dealing with sequential writes. Considering the example used above, if the file writes are received in a random order in either of the segmentation schemes discussed above, this randomness would further decrease the deduplication ratio by decreasing the likelihood that any segment of data (e.g., a 4 KB segment in the example above) would be exactly identical to a previously-stored segment. A variable length segmentation scheme could be used to partially mitigate this problem, but as discussed above, this could increase the computer processing resources that are consumed during this process. Additionally, there also exists a need to minimize file metadata size, as larger-than-necessary metadata can also lead to processing, bandwidth, and storage inefficiencies. As such, minimizing the file metadata size can cause a file system to perform more efficiently and also consume less storage space. For at least these reasons, the need exists for an inline data deduplication system that provides a good balance between processing performance and deduplication ratios, which collectively allows for more efficient use of storage space in a storage system without consuming unnecessary processing resources during the inline deduplication process itself.

This disclosure generally includes methods, computer program products, computer systems, and the like, that provide for optimized segmenting of a data stream for purposes of performing inline data deduplication, among other features and functionality. In one embodiment, functionality is provided for buffering data received from a node, where that data is stored in a buffer as buffered data, an offset value is associated with the data, and a segment size is associated with the buffer; determining whether the buffer is full; in response to determining that the buffer is full, determining whether the offset value is an integer multiple of the segment size; in response to determining that the offset value is not an integer multiple of the segment size, generating a modified segment; determining whether the modified segment is a duplicate of data stored in a deduplicated data store; and in response to a determination that the modified segment is not a duplicate of data stored in the deduplicated data store, storing the modified segment in the deduplicated data store.

In one embodiment, additional functionality includes generating a modified segment by, at least in part, determining a modulo value, where the modulo value is equivalent to a remainder value when the offset value is divided by the segment size. In another embodiment, additional functionality includes generating the modified segment by, at least in part, splitting the data into a first segment and a second segment, such that the first segment comprises a first number of units of the buffered data, the first number of units is based on the modulo value, the second segment comprises a second number of units of the buffered data, and the second number of units is equivalent to the difference of the segment size and the modulo value. In another embodiment, additional functionality includes moving the second segment to a subsequent buffer, and after moving the second segment to the subsequent buffer, writing additional data to the subsequent buffer, where the additional data is received from the node. In another embodiment, additional functionality includes determining if a trigger event has been received, where the determining is performed in response to making or receiving a determination that the buffer is not full; and in response to a determination that a trigger event has been received, deduplicating the buffered data by treating the buffered data as a segment without generating a modified segment. In another embodiment, additional functionality includes, in response to a determination that the offset value is an integer multiple of the segment size, deduplicating the buffered data by treating the buffered data as a segment without creating a modified segment. In another embodiment, additional functionality includes, in response to a determination that the modified segment is a duplicate of data stored in the deduplicated data store, storing the information describing the modified segment without storing a second copy of the modified segment in the deduplicated data store.

FIG. 1 is a block diagram of a network file system 100 including clusters 110(1)-110(x) (collectively, "cluster(s) 110"). Each cluster includes a group of nodes 120. As shown in FIG. 1, cluster 110(1) includes nodes 120(1)(1)-120(1)(n) and cluster 110(x) includes nodes 120(x)(1)-120(x)(m). The nodes 120 within each cluster 110 are connected to each other via a network 130, such as networks 130(1) and 130(2). Each node of nodes 120 can be any computing system that is capable of functioning, or being configured to function, in accordance with the disclosure provided herein. At a minimum, and although not expressly shown in FIG. 1 for the sake of simplicity, each node 120 should include a computer processor, one or more memories, and various other components that are needed to execute one or more applications and to communicate via a network, such as any network 130(1)-130(x) (collectively, "network(s) 130". Additional details about an example node are provide below in FIG. 5.

Moreover, although not expressly depicted in FIG. 1, each node 120 should be capable of hosting one or more virtual machines and executing one or more software applications or other software programs. Additionally, at least one node in each cluster should be capable of being configured to host and/or serve as a gateway appliance (or, more generally, an "appliance"). In one embodiment, an appliance can be a dedicated physical computing device configured to execute a virtual appliance software component, among other features and functionality. In other embodiments, a node (such as any of node 120) can be configured to execute a virtual appliance software component, in addition to other features, functionality, and operations. In other embodiments, a virtual appliance can be hosted on any computing device, such as a server, a desktop or other stand-alone computer, a workstation, a media server, or any other computing device that is capable of hosting a virtual appliance, such as those described in more detail herein. Generally speaking, a virtual appliance software component (or a "virtual appliance," for short) typically differs from a virtual machine in that a virtual machine will commonly be more robust, and will usually contain more functionality than is typically the case with a virtual appliance. However, in certain embodiments, a virtual appliance may be equivalent to or substantially equivalent to a virtual machine. In one embodiment, a virtual appliance can be a virtual machine image file consisting of a pre-configured operating system environment and a single application, as well as any functionality needed to interface with various memory locations. Each appliance and/or virtual appliance will each typically include software that allows the appliance and/or virtual appliance to communicate with other appliance and/or virtual appliances, such as through a network or other connection. In certain embodiments, an appliance and/or a virtual appliance can include more, less, or different components that are expressly described here.

Although other embodiments and configurations are possible, the network file system shown in FIG. 1 depicts one common multi-network file system environment. To that end, FIG. 1 depicts an additional network, network 130(x), which is used to connect clusters 110(1) and 110(x) to storage 180 via a third network, that being network 130(3). In other embodiments, storage 180 is connected to clusters 110 via other connection methods, such as a direct connection. Although these networks have different numbers for the sake of distinguishing among their locations herein, in practice there is not necessarily any material difference between these networks (although they also need not be the same).

Also shown in FIG. 1 is inline processing module 140, which includes chunking module 150, deduplication module 160, and buffer 170, each of which are communicatively coupled to each other. Although only one buffer 170 is shown in FIG. 1, in practice more than one buffer can be used. Moreover, although inline processing module 140, chunking module 150, deduplication module 160, and buffer 170 are shown as being communicatively coupled to network 130(x) in FIG. 1, in practice any or all of these modules can be connected to various components of network file system 100 in different ways. As such, these modules can be located in different portions of network file system 100, and can be subdivided into various components and/or exist in a redundant and/or distributed architecture with respect to each other. Regardless of the exact architecture in which inline processing module 140, chunking module 150, and deduplication module 160 are deployed, these modules can generally take the form of software modules that are configured to perform various functions in conjunction with the disclosure provided herein, and particularly with respect to the chunking and deduplication of data, respectively. Buffer 170 can be any buffer that can be used for storing data, and as noted above, buffer 170 can also include multiple such buffers in various embodiments.

FIG. 1 also depicts storage 180. Although storage 180 is depicted in FIG. 1 as network storage, in practice any form of storage can be used. Among other possibilities, storage 180 can be any form of storage, including, for example, direct attached storage, a storage area network (SAN), network attached storage (NAS), and object storage, among other possibilities. When storage 180 is network storage, any storage area network can be used, and can include components other than, and in addition to, the components that are expressly depicted in FIG. 1. Nevertheless, in the example depicted in FIG. 1, storage 180 depicts certain components of a storage area network that are helpful for discussing and understanding the disclosure provided herein. In the particular embodiment depicted in FIG. 1, storage 180 is depicted as including multiple storage devices, which are shown as storage devices 190(1)-190(z) (collectively, "storage devices 190"). Storage devices 190 can be any type of storage device, such as a data node or other computing system, that is capable of interfacing with a network and containing a main storage component. Among other components, each storage device 190 includes at least one form of a non-transient, computer-readable storage medium that is capable of storing data and retaining data even when powered down, such as, e.g., a hard disk drive or a solid state drive.

As used herein, the letters n, m, x, and z is used to indicate a variable number of devices or components. For example, a variable number of nodes 120 are implemented in each of the clusters 110 described above. Although the letters n and m are used in describing a variable number of instances of various and occasionally different devices and components, a repeated use of any such letter does not necessarily indicate that each device and/or component has a same number of instances as any other component referred to by that same letter. Similarly, the fact that different letters are used in reference to different components does not necessarily mean that those variables have different values in any given embodiment. For instance, in one embodiment, node 110(1) and node 110(x) may have the same number of nodes, even though FIG. 1 depicts node 110(1) as having n nodes 110(1) and further depicts node 110(x) as having m nodes 110(x). Moreover, each of these variables may refer to a different number of instances or components in different embodiments of the systems and methods disclosed herein.

Figure 2:
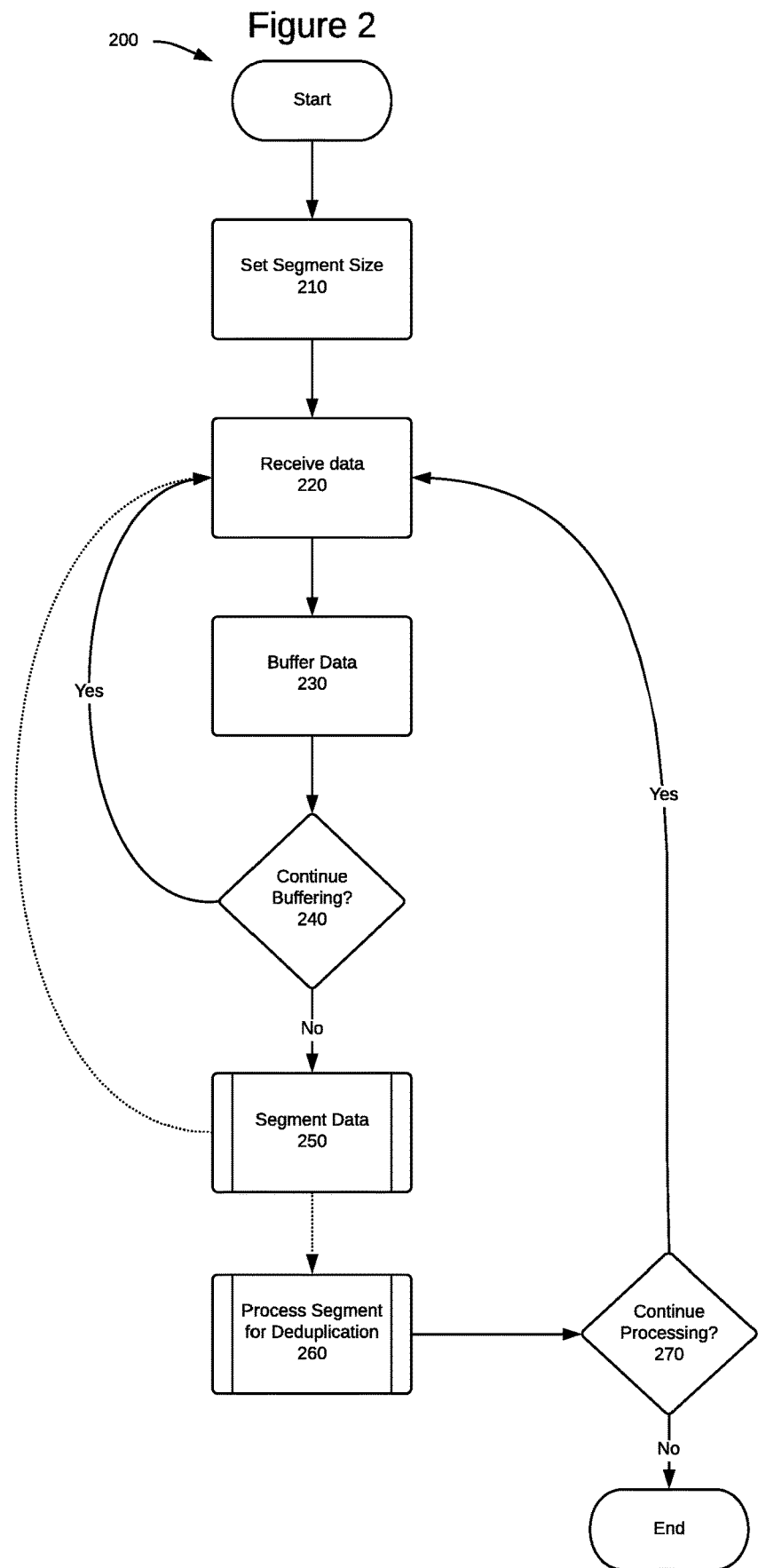
FIG. 2 is a flowchart depicting various actions that can be performed in accordance with various aspects of this disclosure, and according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIG. 1. In various embodiments, one or more steps of method 200 can be performed by chunking module 150 and/or deduplication module 160, among other potential components, such as those described herein.

Method 200 begins at 210, where the method sets (or otherwise determines) the expected segment size that will be used in conjunction with any given embodiment of this disclosure. Although the segment size can be changed in a variable manner within a given embodiment, in the example embodiment discussed herein the segment size will be discussed in terms of a segment size that remains fixed after the segment size has been set. In one embodiment, the segment size is 4 KB. In other embodiments, other segment sizes can be used. In one embodiment, the segment size can be read from a file (e.g., a text file or log file) or hardcoded in computer code used to perform all or part of the functionality described herein. In other embodiments, the segment size can be set in other ways. As will be discussed further below, the segment size value can be used to determine if the buffer is full, which will be discussed in more detail in conjunction with 320, below.

Method 200 then proceeds to 220, where the method receives data. In one embodiment, this data will take the form of a series of writes. In other embodiments, other forms of I/O operations are possible. In one embodiment, this data will be received from one of nodes 120 of FIG. 1. In other environments and embodiments, this data can be received from other locations. Moreover, as alluded to above, this data may originate with a software application and/or a virtual machine that is being executed on the node from which the data originated. In other embodiments, the data may originate from other sources and in other manners.

Method 200 can, and often will, be used in an environment where multiple nodes and/or applications share a common shared storage, such as the example environment shown in FIG. 1. In such a situation, multiple sources may be writing or otherwise sending data to the shared storage at the same time, or at substantially the same time. As such, those sources may be writing data in data streams that are received by processing modules (such as, e.g., chunking module 150 and/or deduplication module 160) simultaneously to other such data streams, substantially simultaneously, alternately, randomly, or in any other such manner where more than one data stream requires process at the same time or at substantially the same time as other such data streams. In any such situation, method 200 should be understood as processing one data stream at a time in the typical embodiment, although multiples instances (e.g., threads, daemons, and so forth) are capable of being executed at the same time in order to process multiple data streams (from different sources) simultaneously, substantially simultaneously, and so forth.

At 230, method 200 buffers the incoming data stream. At 240, a determination is made as to whether method 200 should continue buffering data. Method 200 will continue to buffer data until one of four things happens, namely, the buffer becomes full, a sync or flush call is received, the buffer ages out, or another trigger event occurs. If method 200 determines at 240 that none of these events (or any other events that would cause method 200 to stop buffering data) have occurred, then method 200 returns to 220 and continues to receive more data. However, if method 200 determines at 240 that any of the events mentioned earlier in this paragraph have occurred, method 200 then proceeds to 250, at which point method 200 will segment the data, as is shown in more detail in FIG. 3 and the accompanying discussion herein. Moreover, once method 200 makes an affirmative determination at 240 and proceeds to 250, method 200 will then make a fresh determination as to whether the method should continue buffering the next time that 240 is performed. This is the case because, as will be explained in more detail below, all or at least part of the buffer will be emptied during the segmenting, which means that a buffer that was full (as viewed from a previous pass through method 200) will no longer be full (as viewed from the then-current pass through method 200). Likewise, any sync or flush call will now be in the past (also relative to a subsequent pass through method 200), and a buffer that had aged out will be reset in that regard as well. Thus, the determination of 240 is made anew with each pass through method 200. Although 240 and 250 are shown as distinct steps in FIG. 2 for ease of explanation, in practice the multiple determines of step 240 can each have a different result with respect to the manner in which the data in the buffer is segmented. As such, 240 will be shown in more detail (as three distinct queries) in FIG. 3, along the with the relevant aspects of 250.

After the data has been segmented in 250, method 200 then deduplicates the data in 260, which will be discussed in more detail below in conjunction with FIG. 4 and the accompanying discussion. Method 200 then determines in 270 whether to continue processing. Absent some sort of error or call to exit the method, method 270 will typically evaluate in the affirmative and return to 220 for additional processing. However, should 270 evaluate in the negative for any reason, method 200 concludes.

Figure 3:
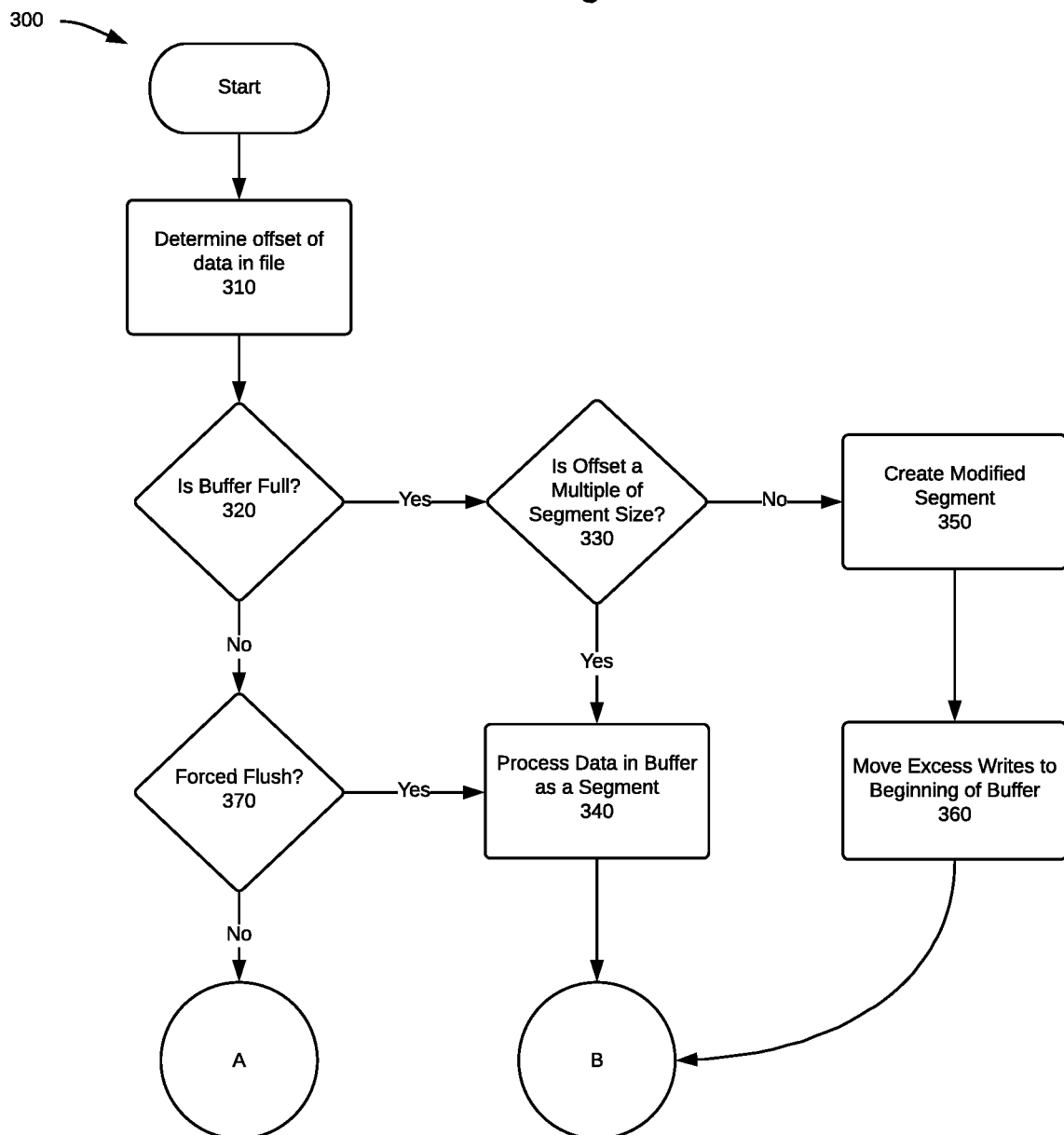
FIG. 3 is a flowchart depicting various actions that can be performed with respect to the segmentation and/or chunking of data, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIG. 1. In various embodiments, one or more steps of method 300 can be performed by chunking module 150, among other potential components, such as those described herein.

Method 300 begins at 310, where the method determines the offset of the data in the file from which the data currently in the buffer originated. In one embodiment, the offset of the data can be the number of bytes (or kilobytes, or other units of data) into the file at which the data is located within the file, from a certain point in the file's data (e.g., the beginning or end of the file). For instance, using the beginning of the file, the very first byte (or kilobyte, or other unit) of data in a file would have an offset of zero (0). The next byte (or kilobyte, or other unit) of data in that file would have an offset of one (1), since the data is "offset" by one byte (or kilobyte, or other unit of data) from the start of the file. In other embodiments, different units (such as, e.g., bytes kilobytes, and so forth) can be used to measure this value. In one embodiment, the offset value can be determined by analyzing metadata associated with the data that is currently in the buffer. In other embodiments, the offset value can be determined in another manner.

As alluded to above, the inquiry made in 240 (regarding whether the method should continue buffering data, or should proceed to segmenting the data in the buffer) includes at least three distinct scenarios that would cause method 200 to proceed to 250 and segment the data in the buffer. The first of these three scenarios is shown in more detail in FIG. 3 at 320. (It will be appreciated that, although one logical order is shown in FIG. 3, in practice the various inquiries of 240 can be performed in a different order than is shown in FIG. 3, and one or more of these inquiries can also be performed simultaneously or substantially simultaneously with the other inquiries of 240.) At 320, method 300 determines whether the buffer is full. This determination is made, at least in part, based on the segment size determined in 210. For instance, in one embodiment, 320 will determine that the buffer is full if the amount of data in the buffer is equal to the expected segment size determined in 210. In other embodiments, the determination of 320 is made in other manners.

If 320 determines that the buffer is full, method 300 will then determine at 330 whether the offset (determined in 310) is an exact whole number multiple (i.e., "a multiple") of the segment size (determined in 210). In other words, 320 determines whether the offset is an exact, whole-number multiple of the segment size. As one example, and regardless of the specific units used (e.g., bytes, kilobytes, and so forth), if the offset is 8 and the segment size is 4, then the offset would be an exact multiple of the segment size (and 320 would evaluate in the affirmative), since 8 divided by 4 equals 2, without any remainder or decimal numbers coming into play. However, if the offset is 9 and the segment size is 4, then the offset would not be an exact multiple of the segment size (and 320 would evaluate in the negative), size since dividing 9 by 4 either results in a remainder of 1. Of course, this functionality can also be used even if the offset and segment size are initially expressed in different units (e.g., bytes and kilobytes), in which case one of the values can be converted to the units of the other value for purposes of the calculations. In one embodiment, this determination can be made by using a modulo, or "mod," function, commonly represented by the % sign. In other embodiments, this determination can be made by dividing the offset by the segment size, and then determining whether the remainder of this calculation is zero (0). In other embodiments, this determination can be made in other ways.

If 330 determines that the offset is a multiple of the segment size, then method 300 proceeds to 340 and processes the data that is currently in the buffer as a segment. This data will then be deduplicated pursuant to method 400, which is discussed below. At this point, method 300 then returns to method 200, via connection B, and proceeds to 260 for further processing (e.g., the deduplication of the data in the buffer).

Conversely, if 330 determines that the offset is not a multiple of the segment size ("SS") (e.g., if the offset cannot be exactly divided by the segment size without a remainder or a decimal number in the quotient, for instance, if the equation "offset % SS" evaluates to any number other than zero (0) or "offset/SS" does not produce a whole number quotient), then method 300 proceeds to 350 and creates a modified segment. This modified segment is created by determining the modulo of "offset % SS," which value (i.e., the modulus) is the remainder when the offset value is divided by the segment size. Method 300 then subtracts this modulus value from the segment size to determine the number of bytes (or other units), measured from the beginning of the buffer, that should be treated as a segment. For instance, and regardless of the specific units used, if the offset is 5 and the segment size is 4, the modulus value (e.g., 5 mod 4, or 5% 4) would be equal to 1. Subtracting this modulus value of 1 from the segment size of 4, would result in a value of 3. As such, in this example, the first 3 units (e.g., bytes, kilobytes, and so forth) of the buffered data would be treated as a segment for purposes of the deduplication of 260 and FIG. 4 and method 400. The "excess" data (or "remainder" of data) from 350 (i.e., the data that was not included in the modified segment created in 360, which in this example is 1 unit of data) would then either be moved in 360 to the front of the current buffer, or to the front of the next buffer. Method 300 would then return to method 200 and deduplicate the modified segment of data in 260; and assuming that 270 evaluates in the affirmative ("yes"), method 200 then continues processing by receiving additional data at 220, which additional data would be appended (or prepending, in certain embodiments) at 230 to the buffer that contains the remaining or "excess" data from 360.

Returning to the decision made in 320, if method 300 determines that the buffer is not full, method 300 determines in 370 whether an indicator indicating the occurrence of a trigger event (e.g., an event causing or requiring the buffer to be flushed, even if the buffer is not full) has been received. In certain embodiments, an indication can take the form of a command, function call, and the like. In other embodiments, an indication can be provided by some other means. A trigger event can be a sync call or a flush call, among other examples. A trigger event can also be indicated by receiving an indication that the data in the buffer has aged out, timed out, expired, or the like. If an indication is received indicating that a trigger event has occurred, method 300 then proceeds to 340 and processes the data that is currently in the buffer as a segment in the manner discussed above in conjunction with 340, and will proceed to 340 even if the buffer is not full when the trigger event indication is received. Conversely, if the buffer is not full (per 320) and a trigger event indication has not been received (per 370), then method 300 returns control, via connection A, to 220 of method 200 and continues to receive data (per 220) and add that data to a buffer (per 230), and so on. Moreover, as the reader will appreciate, although a certain step of logical steps was laid out in FIG. 3 for ease of explanation, in practice, these steps can be performed in different orders, including performing one or more steps at the same time (or at substantially the same time) as each other. In particular, steps 320 and 370 can be performed in either order, and can also be performed at the same time (or at substantially the same time), such as, e.g., by different threads or processing cores, among other possibilities.

Figure 4:
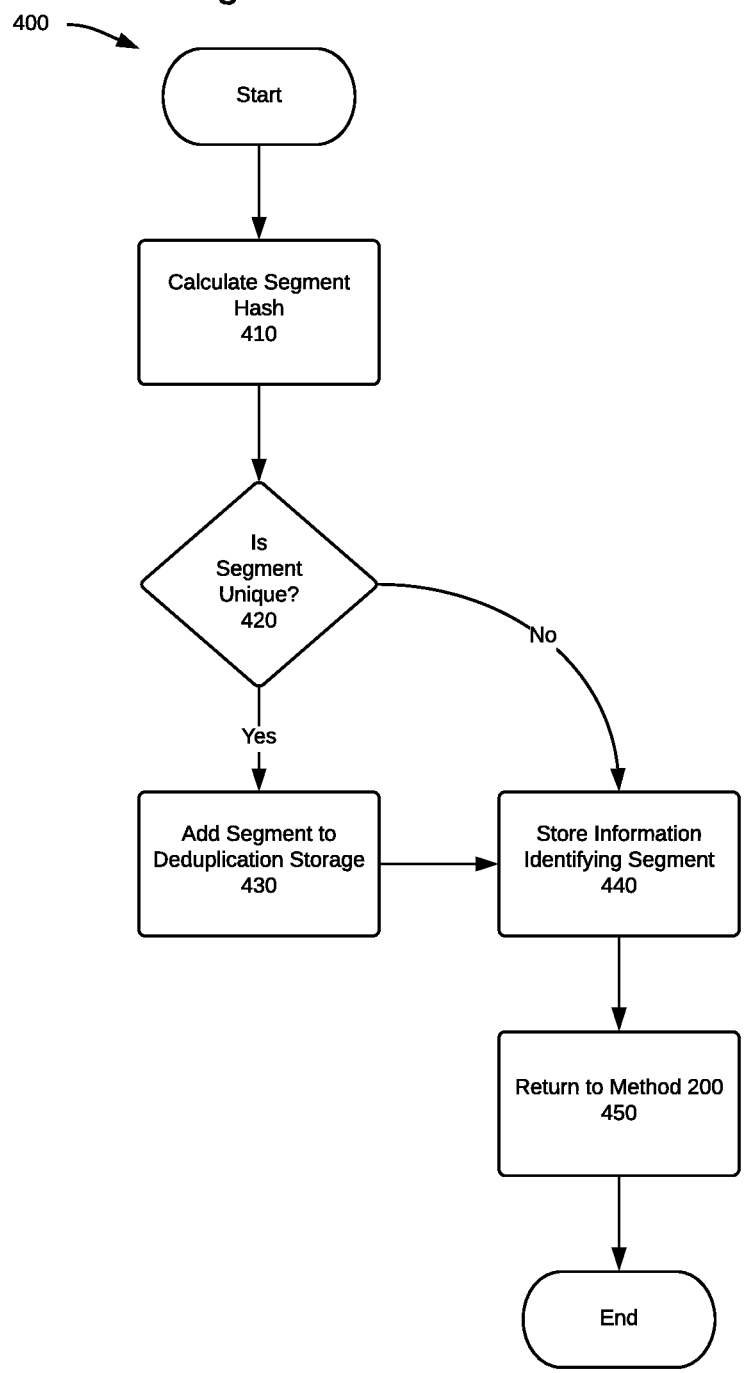
FIG. 4 is a flowchart depicting various actions that can be performed with respect to the deduplication of data, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIG. 1. In various embodiments, one or more steps of method 400 can be performed by deduplication module 160, among other potential components, such as those described herein.

Method 400 begins at 410, where the method calculates a hash value (e.g., fingerprint) for the segment of data that was identified and/or created via modification by method 300. Method 400 then determines at 420 whether this hash value is unique with respect to other segments that have already been stored in a storage device (or shared storage), such as, e.g., storage devices 190 in storage 180. If 420 determines that the hash value of the current segment is unique, then this means that the current segment has not yet been stored in the storage device (or shared storage). As such, method 400 adds the current segment to the storage device (or shared storage) at 430.

At 440, method 400 adds information identifying the segment to the storage device (or shared storage). If 420 determined that the segment was unique, then this information can be metadata associated with the segment. If 420 determined that the segment was not unique, then this means that the current segment was already stored in the storage device (or shared storage), and as such, the current segment is a duplicate that does not have to be stored again. As such, when 420 determines that the segment was not unique, the information stored in 440 can be either metadata and/or a pointer or other data structure (among other potential information) associated with the data of the current segment, which can then later be used to retrieve the data from the data store (e.g., storage device, shared storage, and so forth) if needed. In 450, method 400 then returns to method 200, at which point method 400 itself effectively ends.

Figure 5:
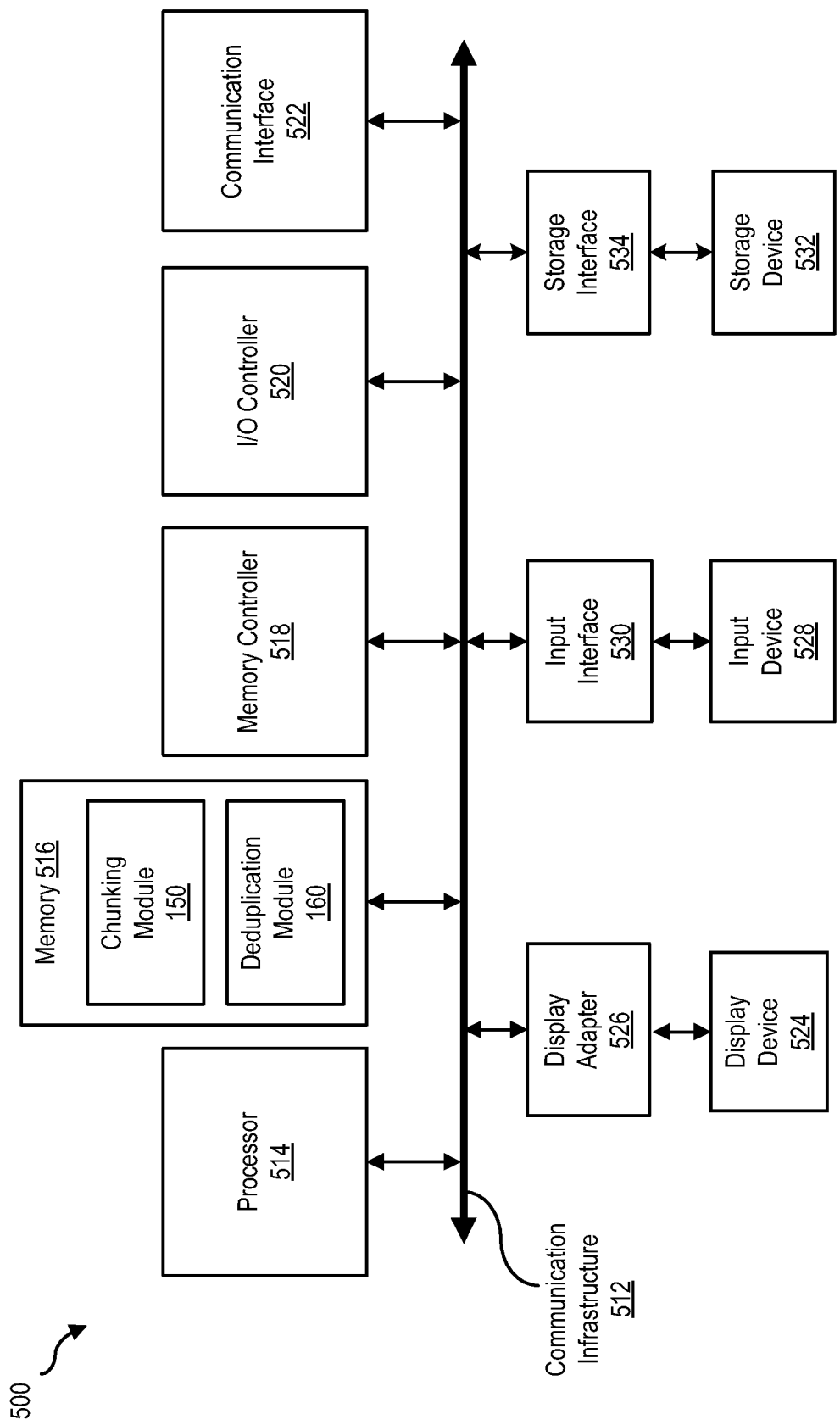
FIG. 5 is a block diagram of a computing device, illustrating how certain features of the instant disclosure can be implemented, according to one embodiment of the present disclosure.

FIG. 5 is a block diagram of a computing system 500 capable of performing one or more of the operations described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 514 and a memory 516. By executing software that invokes, e.g., chunking module 150 and deduplication module 160, or any modifications thereof consistent with this disclosure, computing system 500 becomes a special purpose computing device that is configured to perform operations in the manner described above.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

Memory 516 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 500 may include both a volatile memory unit and a non-volatile storage device. In one example, program instructions implementing on or more operations described herein may be loaded into memory 510.

In certain embodiments, computing system 500 may also include one or more components or elements in addition to processor 514 and memory 516. For example, as illustrated in FIG. 5, computing system 500 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 500. For example, in certain embodiments memory controller 518 may control communication between processor 514, memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 500, such as processor 514, memory 516, communication interface 522, display adapter 526, input interface 530, and storage interface 534.

Communication interface 522 broadly represents any type or form of communication device or adapter capable of facilitating communication between computing system 500 and one or more additional devices. For example, in certain embodiments communication interface 522 may facilitate communication between computing system 500 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 500 to engage in distributed or remote computing. For example, communication interface 522 may receive instructions from a remote device or send instructions to a remote device for execution.

As illustrated in FIG. 5, computing system 500 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 500 may also include at least one input device 528 coupled to communication infrastructure 512 via an input interface 530. Input device 528 generally represents any type or form of input device capable of providing input, either computer or human generated, to computing system 500. Examples of input device 528 include, without limitation, a keyboard, a pointing device, a speech recognition device, or any other input device.

As illustrated in FIG. 5, computing system 500 may also include a storage device 532 coupled to communication infrastructure 512 via a storage interface 534. Storage device 532 generally represents any type or form of storage device or medium capable of storing data and/or other computer-readable instructions. For example, storage device 532 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage device 532 and other components of computing system 500. A storage device like storage device 532 can store information such as the data structures described herein, as well as one or more computer-readable programming instructions that are capable of causing a computer system to execute one or more of the operations described herein.

In certain embodiments, storage device 532 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 532 may also include other similar structures or devices for allowing computer software, data, or other computer-readable instructions to be loaded into computing system 500. For example, storage device 532 may be configured to read and write software, data, or other computer-readable information. Storage devices 532 may also be a part of computing system 500 or may be a separate device accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The non-transient computer-readable storage medium containing the computer programming instructions may be loaded into computing system 500. All or a portion of the computer programming instructions stored on the non-transient computer-readable storage medium may then be stored in memory 516 and/or various portions of storage device 532. When executed by processor 514, a computer program loaded into computing system 500 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

Figure 6:
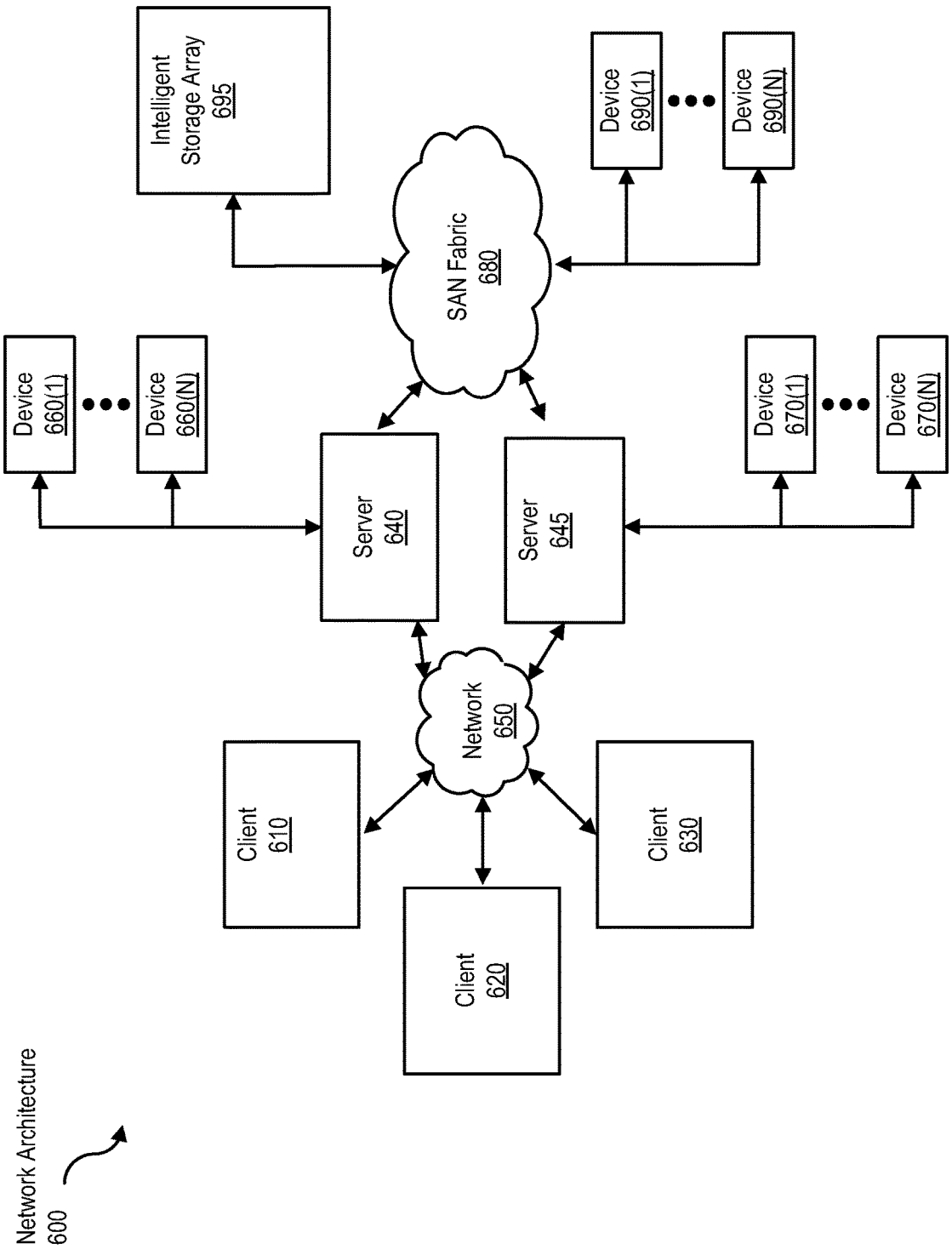
FIG. 6 is a block diagram of a networked system, illustrating how various computing devices can communicate via a network, according to one embodiment of the present disclosure.

FIG. 6 is a block diagram of a network architecture 600 in which client systems 610, 620, and 630, and servers 640 and 645 may be coupled to a network 650. Client systems 610, 620, and 630 generally represent any type or form of computing device or system, such as computing system 500 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of client systems 610, 620, and/or 630 may include software configured to execute, e.g., chunking module 150 and deduplication module 160, and/or one or more components or threads thereof.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store backup information and storage configuration information, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 500 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
buffering data received from a node, wherein
the data is stored in a buffer, as buffered data,
an offset value is associated with the data, and
a segment size is associated with the buffer;
determining whether the offset value is an integer multiple of the segment size;
in response to a determination that the offset value is an integer multiple of the segment size, processing the data in the buffer as a segment;
determining whether the segment is a duplicate of data stored in a deduplicated data store; and
in response to a determination that the segment is not a duplicate of data stored in the deduplicated data store, storing the segment in the deduplicated data store.

2. The method of claim 1, further comprising:
determining whether the buffer is full, wherein
the determining whether the offset value is an integer multiple of the segment size is performed in response to a determination that the buffer is full.

3. The method of claim 1, further comprising:
determining whether the buffer is full;
in response to a determination that the buffer is not full, determining if a trigger event has been received; and
in response to a determination that a trigger event has been received, deduplicating the buffered data by treating the buffered data as a segment without generating a modified segment.

4. The method of claim 1, further comprising:
determining whether the buffer is full;
in response to a determination that the buffer is not full, determining if a trigger event has been received;
in response to a determination that a trigger event has not been received, receiving additional data from the node; and
buffering the additional data by storing the additional data in the buffer along with the buffered data, in order to create modified buffered data.

5. The method of claim 4, further comprising:
subsequent to buffering the additional data, determining whether the buffer is full;
in response to a determination that the buffer is full, determining whether the offset value is an integer multiple of the segment size;
in response to determining that the offset value is not an integer multiple of the segment size, generating a modified segment;
determining whether the modified segment is a duplicate of data stored in a deduplicated data store; and
in response to a determination that the modified segment is not a duplicate of data stored in the deduplicated data store, storing the modified segment in the deduplicated data store.

6. The method of claim 5, further comprising:
the generating the modified segment further comprises splitting the data into a first segment and a second segment, wherein
the first segment comprises a first number of units of the buffered data,
the first number of units is based on a modulo value,
the second segment comprises a second number of units of the buffered data, and
the second number of units is equivalent to a difference of the segment size and the modulo value;
moving the second segment to a subsequent buffer; and
after the moving, writing additional data to the subsequent buffer, wherein
the additional data is received from the node.

7. The method of claim 1, further comprising
in response to the determination that the offset value is the integer multiple of the segment size, treating the buffered data as a segment without creating a modified segment.

8. A system comprising:
a microprocessor; and
a non-transient computer-readable storage medium, comprising computer instructions, executable by the microprocessor and configured to perform a method comprising
buffering data received from a node, wherein
the data is stored in a buffer, as buffered data,
an offset value is associated with the data, and
a segment size is associated with the buffer,
determining whether the offset value is an integer multiple of the segment size,
in response to a determination that the offset value is an integer multiple of the segment size, processing the data in the buffer as a segment,
determining whether the segment is a duplicate of data stored in a deduplicated data store, and
in response to a determination that the segment is not a duplicate of data stored in the deduplicated data store, storing the segment in the deduplicated data store.

9. The system of claim 8, wherein the method further comprises:
determining whether the buffer is full, wherein
the determining whether the offset value is an integer multiple of the segment size is performed in response to a determination that the buffer is full.

10. The system of claim 8, wherein the method further comprises:
determining whether the buffer is full;
in response to a determination that the buffer is not full, determining if a trigger event has been received; and
in response to a determination that a trigger event has been received, deduplicating the buffered data by treating the buffered data as a segment without generating a modified segment.

11. The system of claim 8, wherein the method further comprises:
determining whether the buffer is full;
in response to a determination that the buffer is not full, determining if a trigger event has been received;
in response to a determination that a trigger event has not been received, receiving additional data from the node; and
buffering the additional data by storing the additional data in the buffer along with the buffered data, in order to create modified buffered data.

12. The system of claim 11, wherein the method further comprises:
subsequent to buffering the additional data, determining whether the buffer is full;
in response to a determination that the buffer is full, determining whether the offset value is an integer multiple of the segment size;

in response to determining that the offset value is not an integer multiple of the segment size, generating a modified segment;

determining whether the modified segment is a duplicate of data stored in a deduplicated data store; and in response to a determination that the modified segment is not a duplicate of data stored in the deduplicated data store, storing the modified segment in the deduplicated data store.

13. The system of claim 12, wherein the method further comprises:

the generating the modified segment further comprises splitting the data into a first segment and a second segment, wherein the first segment comprises a first number of units of the buffered data, the first number of units is based on a modulo value, the second segment comprises a second number of units of the buffered data, and the second number of units is equivalent to a difference of the segment size and the modulo value;

moving the second segment to a subsequent buffer; and after the moving, writing additional data to the subsequent buffer, wherein the additional data is received from the node.

14. The system of claim 8, wherein the method further comprises:

in response to the determination that the offset value is the integer multiple of the segment size, treating the buffered data as a segment without creating a modified segment.

15. A computer program product, comprising a plurality of instructions stored on a non-transient computer-readable storage medium, wherein the instructions are configured to execute a method comprising:

buffering data received from a node, wherein the data is stored in a buffer, as buffered data, an offset value is associated with the data, and a segment size is associated with the buffer;

determining whether the offset value is an integer multiple of the segment size;

in response to a determination that the offset value is an integer multiple of the segment size, processing the data in the buffer as a segment;

determining whether the segment is a duplicate of data stored in a deduplicated data store; and in response to a determination that the segment is not a duplicate of data stored in the deduplicated data store, storing the segment in the deduplicated data store.

16. The computer program product of claim 15, wherein the method further comprises:

determining whether the buffer is full, wherein the determining whether the offset value is an integer multiple of the segment size is performed in response to a determination that the buffer is full.

17. The computer program product of claim 15, wherein the method further comprises:

determining whether the buffer is full;

in response to a determination that the buffer is not full, determining if a trigger event has been received; and in response to a determination that a trigger event has been received, deduplicating the buffered data by treating the buffered data as a segment without generating a modified segment.

18. The computer program product of claim 15, wherein the method further comprises:

determining whether the buffer is full;

in response to a determination that the buffer is not full, determining if a trigger event has been received;

in response to a determination that a trigger event has not been received, receiving additional data from the node; and buffering the additional data by storing the additional data in the buffer along with the buffered data, in order to create modified buffered data.

19. The computer program product of claim 18, wherein the method further comprises:

subsequent to buffering the additional data, determining whether the buffer is full;

in response to a determination that the buffer is full, determining whether the offset value is an integer multiple of the segment size;

in response to determining that the offset value is not an integer multiple of the segment size, generating a modified segment;

determining whether the modified segment is a duplicate of data stored in a deduplicated data store; and in response to a determination that the modified segment is not a duplicate of data stored in the deduplicated data store, storing the modified segment in the deduplicated data store.

20. The computer program product of claim 19, wherein the method further comprises:

the generating the modified segment further comprises splitting the data into a first segment and a second segment, wherein the first segment comprises a first number of units of the buffered data, the first number of units is based on a modulo value, the second segment comprises a second number of units of the buffered data, and the second number of units is equivalent to a difference of the segment size and the modulo value;

moving the second segment to a subsequent buffer; and after the moving, writing additional data to the subsequent buffer, wherein the additional data is received from the node.

* * * * *